United States Patent
Jain et al.

(10) Patent No.: US 10,546,242 B2
(45) Date of Patent: Jan. 28, 2020

(54) IMAGE ANALYSIS NEURAL NETWORK SYSTEMS

(71) Applicant: General Electric Company, Schenectady, NY (US)

(72) Inventors: Arpit Jain, Schenectady, NY (US); Swaminathan Sankaranarayanan, College Park, MD (US); David Scott Diwinsky, West Chester, OH (US); Ser Nam Lim, Niskayuna, NY (US); Kari Thompson, West Chester, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 228 days.

(21) Appl. No.: 15/495,313

(22) Filed: Apr. 24, 2017

(65) Prior Publication Data

US 2018/0253866 A1  Sep. 6, 2018

Related U.S. Application Data

(60) Provisional application No. 62/466,777, filed on Mar. 3, 2017.

(51) Int. Cl.
*G06N 7/00* (2006.01)
*G06K 9/62* (2006.01)
*G06N 3/08* (2006.01)

(52) U.S. Cl.
CPC .......... *G06N 7/005* (2013.01); *G06K 9/6267* (2013.01); *G06N 3/084* (2013.01)

(58) Field of Classification Search
CPC .......... G06N 7/005; G06N 3/084; G06N 3/04; G06K 9/628; G06K 9/6267
(Continued)

(56) References Cited

U.S. PATENT DOCUMENTS 5,461,699 A   10/1995   Arbabi et al.
5,566,275 A   10/1996   Kano
(Continued)

FOREIGN PATENT DOCUMENTS

CN   104102919 A   10/2014
CN   104484682 A   4/2015
(Continued)

OTHER PUBLICATIONS

Wang et al., "Competitive Hopfield Network Combined With Estimation of Distribution for Maximum Diversity Problems", IEEE Transactions on Systems, Man, and Cybernetics, Part B (Cybernetics), vol. 39, Issue: 4, pp. 1048-1066, Aug. 2009.
(Continued)

*Primary Examiner* — Amandeep Saini
(74) *Attorney, Agent, or Firm* — Christopher R. Carroll; The Small Patent Law Group LLC

(57) ABSTRACT

A method includes determining object class probabilities of pixels in a first input image by examining the first input image in a forward propagation direction through layers of artificial neurons of an artificial neural network. The object class probabilities indicate likelihoods that the pixels represent different types of objects in the first input image. The method also includes selecting, for each of two or more of the pixels, an object class represented by the pixel by comparing the object class probabilities of the pixels with each other, determining an error associated with the object class that is selected for each pixel of the two or more pixels, determining one or more image perturbations by backpropagating the errors associated with the object classes selected for the pixels of the first input image through the layers of the neural network without modifying the neural network, and modifying a second input image by applying the one or more image perturbations to one or more of the first input image or the second input image prior to providing the second input image to the neural network for examination by the neurons in the neural network for automated object recognition in the second input image.

10 Claims, 11 Drawing Sheets

(58) Field of Classification Search
USPC .......................................................... 382/156
See application file for complete search history.

(56) References Cited

U.S. PATENT DOCUMENTS

| | | | |
|---|---|---|---|
| 5,590,218 | A | 12/1996 | Ornstein |
| 5,640,494 | A | 6/1997 | Jabri et al. |
| 5,659,666 | A | 8/1997 | Thaler |
| 6,269,351 | B1 | 7/2001 | Black |
| 6,775,619 | B2 | 8/2004 | Nyland |
| 7,039,239 | B2 | 5/2006 | Loui et al. |
| 7,369,682 | B2 | 5/2008 | Yang et al. |
| 7,809,300 | B2 | 10/2010 | Saeki et al. |
| 7,945,101 | B2 | 5/2011 | Chen et al. |
| 7,995,810 | B2 | 8/2011 | Li et al. |
| 8,346,691 | B1 | 1/2013 | Subramanian et al. |
| 8,406,525 | B2 | 3/2013 | Ma et al. |
| 8,990,132 | B2 | 3/2015 | Lo |
| 9,558,268 | B2 | 1/2017 | Tuzel et al. |
| 2010/0179935 | A1 | 7/2010 | Srinivasa et al. |
| 2010/0183217 | A1 | 7/2010 | Seung et al. |
| 2015/0371132 | A1 | 12/2015 | Gemello et al. |
| 2016/0034814 | A1 | 2/2016 | Audhkhasi et al. |
| 2016/0048741 | A1 | 2/2016 | Nguyen et al. |
| 2016/0098633 | A1 | 4/2016 | Min |
| 2016/0162781 | A1 | 6/2016 | Lillicrap et al. |
| 2016/0328643 | A1 | 11/2016 | Liu et al. |
| 2017/0011281 | A1 | 1/2017 | Dijkman et al. |
| 2017/0252922 | A1* | 9/2017 | Levine ..................... B25J 9/161 |

FOREIGN PATENT DOCUMENTS

| | | |
|---|---|---|
| CN | 104517284 A | 4/2015 |
| CN | 105512289 A | 4/2016 |
| CN | 105551036 A | 5/2016 |
| EP | 0438573 A1 | 7/1991 |
| EP | 0539018 A1 | 4/1993 |
| WO | 2014205231 A1 | 12/2014 |
| WO | 2016195496 A2 | 12/2016 |

OTHER PUBLICATIONS

Cheng et al., "Maximum burning rate and fixed carbon burnout efficiency of power coal blends predicted with back-propagation neural network models", Fuel, vol. 172, pp. 170-177, May 15, 2016.
Xia et al., "Adversarial Examples Generation and Defense Based on Generative Adversarial Network", pp. 1- 6, Dec. 15, 2016.
Narodytska et al., "Simple black-box adversarial perturbations for deep networks", pp. 1-18, 2017.
Warde-Farley et al., "Adversarial Perturbations of Deep Neural Networks", pp. 1-34.
Buhmann et al., "Unsupervised And Supervised Data Clustering With Competitive Neural Networks", IJCNN International Joint Conference on Neural Networks, vol. 4, pp. 796-801, 1992.
Weston et al., "Deep Learning via Semi-Supervised Embedding", Appearing in Proceedings of the 25th International Conference on Machine Learning, pp. 1-8, 2008.
Dapena et al., "Combination Of Supervised And Unsupervised Algorithms For Communication Systems With Linear Precoding", The 2010 International Joint Conference on Neural Networks (IJCNN), pp. 1-8, 2010.
Cho et al., "Image Segmentation from Consensus Information", Computer vision and image understanding, vol. 68, Issue: 1, pp. 72-89, 1997.
Huang et al., "QualityNet: Segmentation quality evaluation with deep convolutional networks", 2016 Visual Communications and Image Processing (VCIP), pp. 1-4, 2016, Chengdu.
Saito et al., "Real-Time Facial Segmentation and Performance Capture from RGB Input", University of Southern California, pp. No. 01-18, Apr. 10, 2016 (18 pages).
Moosavi-Dezfooli et al., "DeepFool: a simple and accurate method to fool deep neural networks", Journal of IEEE, pp. No. 2574-2582, Jul. 4, 2016 (9 pageS).
Qi et al., "PointNet: Deep Learning on Point Sets for 3D Classification and Segmentation", Stanford University, pp. No. 01-19, Dec. 2, 2016.
Leverington, "A Basic Introduction to Feedforward Backpropagation Neural Networks", Neural Network Basics, Texas Tech University department of Geosciences, 2009, http://www.webpages.ttu.edu/dleverin/neural_network/neural_networks.html (25 pages).
Nielsen, "Neural Networks and Deep Learning", Chapter 1, Determination Press, 2015, http://neuralnetworksanddeeplearning.com/chap1.html, (54 pages).
Taner, "Neural Networks and Computation of Neural Network Weights and Biases by the Generalized Delta Rule and Back Propagation of Errors", Rock Solid Images, 1995, (11 pages).
Karpathy, "CS231n Convolutional Neural Networks for Visual Recognition", http://cs231n.github.io/neural-networks-1/, (15 pages).
Karpathy, "CS231n Convolutional Neural Networks for Visual Recognition" http://cs231n.github.io/convolutional-networks/, (26 pages).
Goodfellow et al, "Generative Adversarial Nets", Universite de Montreal, (9 pages).

* cited by examiner

IMAGE ANALYSIS NEURAL NETWORK SYSTEMS

CROSS-REFERENCE TO RELATED APPLICATIONS

This application claims priority to U.S. Provisional Application No. 62/466,777, which was filed on 3 Mar. 2017, and the entire disclosure of which is incorporated herein by reference.

FIELD

The subject matter described herein relates to image analysis systems that use one or more neural networks.

BACKGROUND

Neural networks can be used to analyze images for a variety of purposes. For example, some neural networks can examine images in order to identify objects depicted in the images. The neural networks can be established or modified (e.g., trained) to detect various objects in images by providing the neural networks with labeled training images. The labeled training images include images having known objects depicted in the images, with each pixel in the labeled training images identified according to what object or type of object the pixel at least partially represents.

But, the process for labeling training images is a time-consuming, costly, and/or laborious process. While some crowd-sourcing approaches have been used to reduce the time and/or cost involved in labeling the training images, not all images are available for public dissemination for the crowd-sourcing solutions. For example, medical images can be subject to laws that restrict dissemination of the images, images of certain objects (e.g., airplane engines) may not be open to public dissemination due to contractual and/or governmental restrictions, other images may be subject to privacy laws that restrict public dissemination, etc.

BRIEF DESCRIPTION

In one embodiment, a method includes determining object class probabilities of pixels in a first input image by examining the first input image in a forward propagation direction through layers of artificial neurons of an artificial neural network. The object class probabilities indicate likelihoods that the pixels represent different types of objects in the first input image. The method also includes selecting, for each of two or more of the pixels, an object class represented by the pixel by comparing the object class probabilities of the pixels with each other, determining an error associated with the object class that is selected for each pixel of the two or more pixels, determining one or more image perturbations by back-propagating the errors associated with the object classes selected for the pixels of the first input image through the layers of the neural network without modifying the neural network, and modifying a second input image by applying the one or more image perturbations to one or more of the first input image or the second input image prior to providing the second input image to the neural network for examination by the neurons in the neural network for automated object recognition in the second input image.

In one embodiment, a method includes determining an output image by examining an input in a forward propagation direction through layers of artificial neurons in a first artificial neural network, identifying one or more differences between the output image and the ground truth image by comparing characteristics of pixels in the output image with characteristics of pixels in the ground truth image, determining one or more image perturbations by back-propagating the one or more differences between the output image and the ground truth image through the layers of the first neural network, and training at least one other artificial neural network using the one or more image perturbations.

In one embodiment, a method includes creating one or more distribution-based image perturbations using a generator of a generative adversarial network (GAN) based on a distribution of one or more characteristics of pixels in image perturbations received by the GAN from a neural network, determining whether the one or more distribution-based image perturbations are one or more of similar or identical to the image perturbations received from the neural network using a discriminator of the GAN, and modifying one or more input images provided to the neural network using the one or more distribution-based image perturbations for automated object recognition by the neural network responsive to determining that the one or more distribution-based image perturbations are one or more of similar or identical to the image perturbations received from the neural network.

In one embodiment, a method includes, for each pixel of two or more pixels in a first image, determining probabilities that the pixel represents different associated object classes using a first artificial neural network, comparing the probabilities to a designated, non-zero probability threshold, labeling the pixel as representing the object class associated with the first probability responsive to determining that a first probability of the probabilities for the pixel exceeds the designated, non-zero probability threshold, and training at least one of the first artificial neural network or a different, second artificial neural network to automatically recognize one or more objects in one or more input images using the pixel that is labeled.

In one embodiment, a method includes determining object class probabilities of pixels in an input image using an artificial neural network having artificial neurons that apply weighted functions to one or more characteristics of the pixels to determine the object class probabilities, determining which of the object class probabilities for the pixel is associated with a larger potential error in object classification than one or more of the object class probabilities for the pixel for each pixel of at least one of the pixels in the input image, changing one or more weights applied by the artificial neurons in the weighted functions based on the larger potential error associated with the object class probabilities, and re-determining the object class probabilities of the pixels in the input image using the weighted functions with the one or more weights that were changed to automatically detect one or more objects in the input image.

In one embodiment, a method includes forward propagating one or more unsupervised images through an artificial neural network to determine potential pixel labels, back-propagating one or more potential errors in the potential pixel labels through the neural network to determine guided image perturbations, adding the guided image perturbations to the one or more unsupervised images, and forward propagating the guided image perturbations with the one or more supervised images through the neural network to generate ground truth output. The ground truth output is configured to train one or more of the neural network or another neural network.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
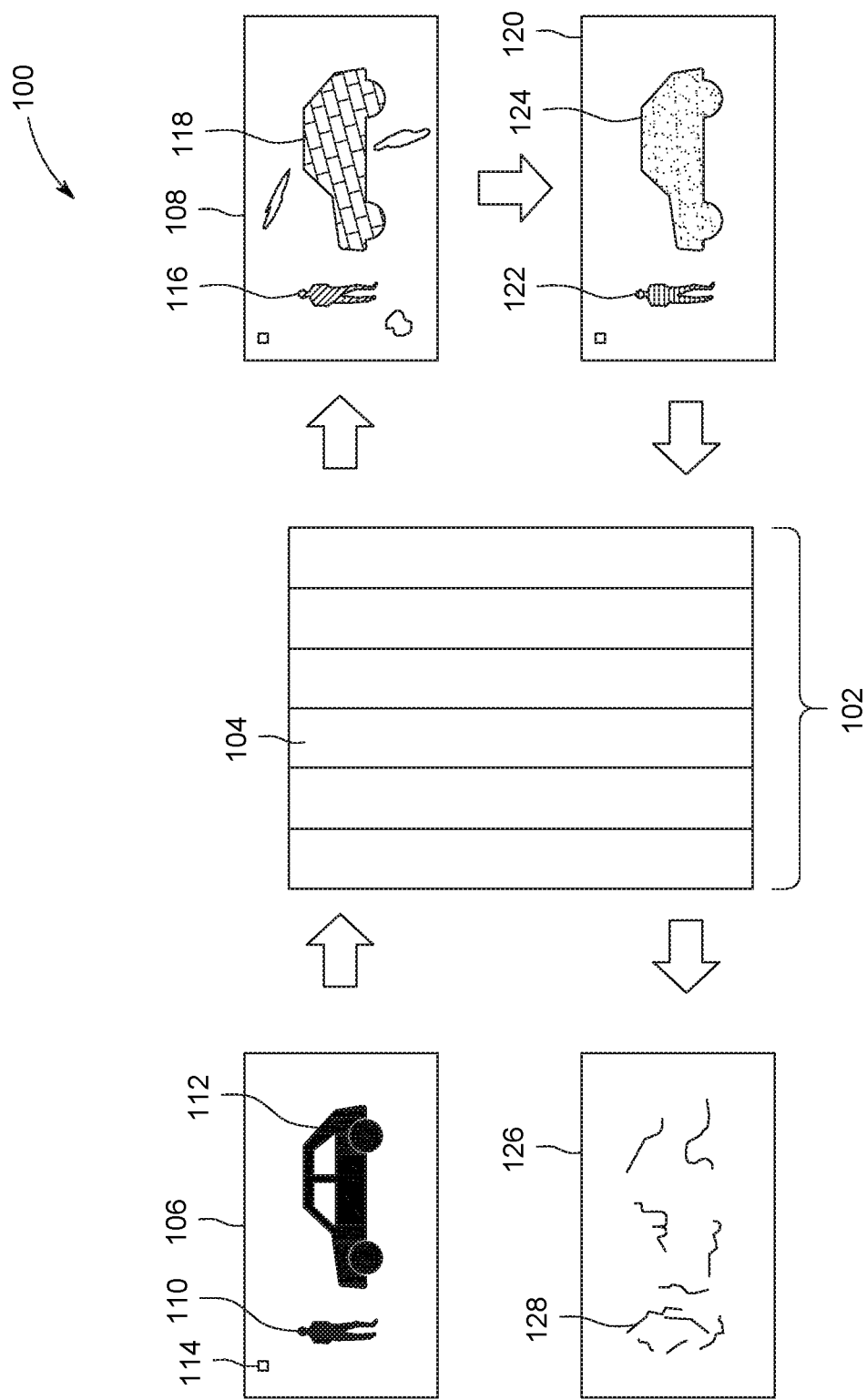
FIG. 1 illustrates one embodiment of an image analysis neural network system.

One embodiment of the inventive subject matter described herein provides an image analysis system and method that employs context guided object prediction in neural networks. The system and method improve the comprehension and depth of what is learned by neural networks from images, without having to reteach the neural networks with new or additional labeled training images. In one embodiment, a labeled training image is an image where all or a substantial portion of the pixels forming the image are associated with an object class. An object class is a type or category of an object appearing in the image. For example, a human body can be one object class while an automobile is another, different object class. As another example, spalling on a thermal barrier coating on a turbocharger blade can be one object class while a crack in the turbocharger blade is another, different object class.

A pixel can be labeled (e.g., associated) with probabilities that the pixel represents various different object classes by a vector [a b c d], where the values of a, b, c, and d indicate the probability of the pixel representing each of a different classes of objects or things. In a labeled training image, a pixel labeled as [1 0 0 0] can indicate that there is a 100% probability that the pixel represents at least a portion of an object of a first class (e.g., object class human body represented by probability a), a zero probability that the pixel represents at least a portion of an object of a different, second class (e.g., object class automobile represented by probability b), a zero probability that the pixel represents at least a portion of an object of a different, third class (e.g., object class ground represented by probability c), and a zero probability that the pixel represents at least a portion of an object of a different, fourth class (e.g., object class tree represented by probability d).

Artificial neural networks include artificial neurons, or nodes, that receive input images and perform operations (e.g., functions) on the images, selectively passing the results on to other neurons. Weight values are associated with each vector and neuron in the network, and these values constrain how input images are related to outputs of the neurons. Weight values can be determined by the iterative flow of training data through the network. For example, weight values are established during a training phase in which the network learns how to identify particular object classes by typical input data characteristics of the objects in training or ground truth images.

The system and method can input perturbations to the neural network, which help the network by providing context to make a more accurate prediction of the objects depicted in an image without additional learning or data (e.g., without use of additional labeled training images). This approach can be independent of the architecture of the deep learning system or neural network. The system can be taught to segment different types of images, with more accuracy than is available by other currently known systems. The system can be trained with less data relative to currently known systems, as the importance of training samples during training can be weighed. For example, a crack misclassified by the system can be corrected by enhancing the context through input perturbation.

Previously, Conditional Random Field (CRF) was used to smooth out or clarify missing parts of an image. Some inventive systems and methods described herein allow for the perturbation (e.g., modification) of an input image to make a more accurate prediction without any additional post processing of the image. The system and method can employ post processing or changing the architecture or training with additional data, but this may not be required. Due to the amount of detail that can be generated using the learning described herein, the systems and methods can be used to segment different types of defects shown in images by reading in the images, and can be significantly more accurate. Additionally, less data can be used to achieve similar performances to what is currently available, without the need for additional training data, or relearning. The system and method can improve performance from what the system and method have previously learned.

At least one technical effect of the systems and methods described herein includes the rapid and accurate identification of objects depicted in one or more images for a variety of end uses, such as for the identification and repair of damage to a component (e.g., repair of a thermal barrier coating in an engine), the automatic changing of movement of a vehicle (e.g., changing a direction of movement and/or applying brakes in response to identifying a person or other object in an image), or the like. In medical applications, the systems and methods can rapidly and accurately identify tumors, lesions, or the like, from images and the systems and methods can automatically implement one or more medical procedures to remove or repair the identified tumor or lesion.

Figure 2:
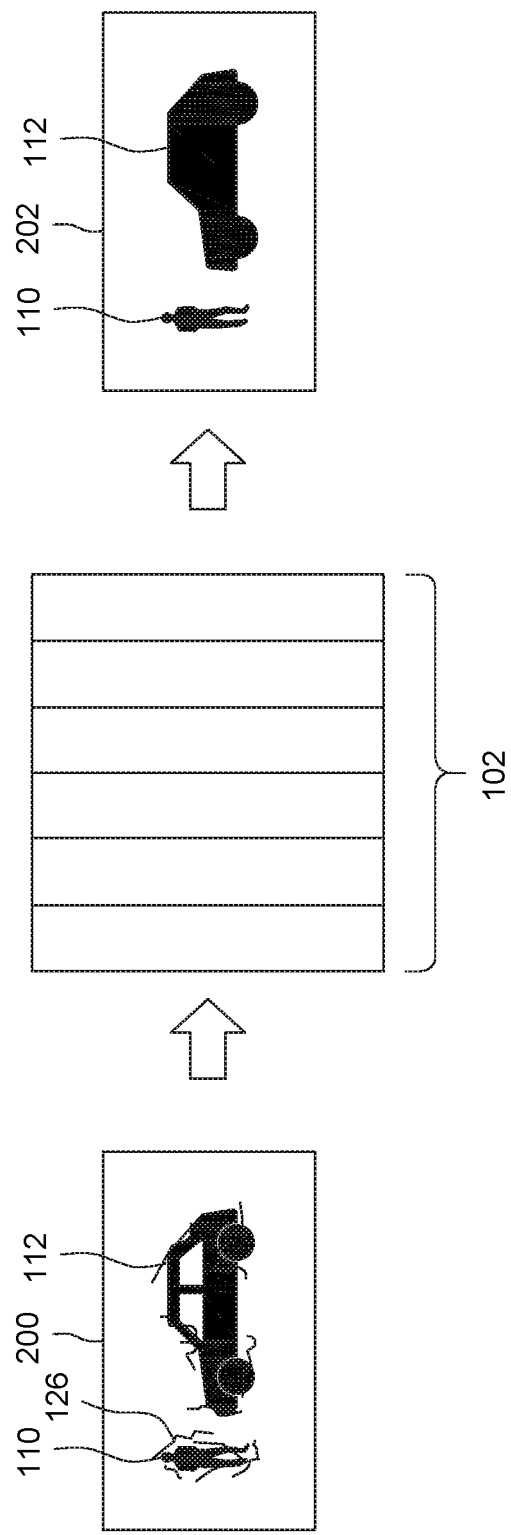
FIG. 2 also illustrates the image analysis neural network system shown in FIG. 1.

FIGS. 1 and 2 illustrate one embodiment of an image analysis neural network system 100. The system 100 uses context guided prediction for object identification in images using one or more deep neural networks 102. The neural network 102 is an artificial neural network formed from one or more processors (e.g., microprocessors, integrated circuits, field programmable gate arrays, or the like). The neural network 102 is divided into two or more layers 104, such as an input layer that receives an input image 106, an output layer that outputs an output image 108, and one or more intermediate layers. The layers 104 of the neural network 102 represent different groups or sets of artificial neurons, which can represent different functions performed by the processors on the input image 106 to identify objects in the input image 106. The artificial neurons apply different weights in the functions applied to the input image 106 to attempt to identify the objects in the input image 106. The output image 108 is generated by the neural network 102 by assigning or associating different pixels in the output image 108 with different object classes (described below) based on analysis of characteristics of the pixels. Because the neural network 102 may not be 100% accurate in predicting what objects are represented by different pixels, the output image 108 may not exactly resemble or depict the objects in the input image 106, as shown in FIGS. 1 and 2.

The artificial neurons in the layers 104 of the neural network 102 can examine individual pixels 114 in the input image 106. The processors (operating as the artificial neurons) can use linear classification to calculate scores for different categories of objects (referred to herein as "classes"), such as a tree, a car, a person, spalling of a thermal barrier coating, a crack in a surface, a sign, or the like. These scores can indicate the probability that a pixel 114 represents different classes. For example, the score for a pixel 114 can be represented as one or more of the vectors described above. Each artificial neuron can apply a mathematical function, such as an activation function, to the same pixel, with the functions applied by different neurons impacting the functions applied by other neurons and different neurons applying different weights to different terms in the functions than one or more, or all other neurons. Application of the functions generates the classification scores for the pixels 114, which can be used to identify the objects in the input image 106.

In one embodiment, the input image 106 is provided to the neural network 102 via one or more wired and/or wireless connections from a source, such as a camera. The neurons in the layers 104 of the neural network 102 examine the characteristics of the pixels 114, such as the intensities, colors, or the like, to determine the scores for the various pixels 114. The neural network 102 examines the score vector of each pixel 114 after the layers 104 of the neural network 102 have determined the score vectors for the pixels 114 and determines which object class has the highest probability for each pixel 114 or which object class has a higher probability than one or more, or all, other object classes for each pixel 114.

For example, a first pixel 114 having a score vector of [0.6 0.15 0.05 0.2] indicates that the neural network 102 calculated a 60% probability that the first pixel 114 represents a first object class (e.g., a human body or person), a 15% probability that the first pixel 114 represents a second object class (e.g., a car), a 5% probability that the first pixel 114 represents a third object class (e.g., a tree), and a 20% probability that the first pixel 114 represents a fourth object class (e.g., the ground). These probabilities can be represented by the output image 108, with different areas 116, 118 representative of different objects based on these calculated probabilities. The areas 116, 118 may slightly represent the objects 110, 112, but may not accurately represent or indicate the objects 110, 112 due to the probabilities being less than 100%. The processors can determine that the pixel 114 represents the object class having the greatest or largest of these probabilities. For example, the processors can determine that the pixel 114 represents a human person due to the 60% probability. This process can be repeated for several, or all, other pixels 114.

The processors of the neural network 102 can then determine error values between the selected object class for a pixel 114 and the object score for that object class. This error value can be a difference between 100% (or one) and the probability of the selected object class. With respect to the preceding example, the error value can be calculated for the first pixel 114 as [0.4 −0.15 −0.05 −0.2]. The value of 0.4 (or 40%) is calculated as the difference between one and 0.6 (or between 100% and 60%). The values of the other object classes are set to zero. This process can be repeated for several, or all, of the pixels 114. A set of error values 120 can be determined based on these calculated error values, with each pixel 114 indicative of a different error value and different groups 120, 122 of the error values potentially representative of different objects 110, 112 in the input image 106.

The processors of the neural network 102 then back-propagate the set of error values 120 back through the layers 104 of the neural network 102. For example, for the first pixel 114 in the preceding example, the vector of the error value of [0.4 −0.15 −0.05 −0.2] can be back-propagated through the neural network 102. The layers 104 of artificial neurons in the neural network 102 can examine the input image 104 in sequential order, with a first hidden layer of the neurons examining each pixel 114, followed by the neurons in a second hidden layer, followed by the neurons in a third hidden layer, and so on, to calculate the score vectors of the pixels 114, as described above. The application of functions to characteristics of a pixel 114 by the neurons in a layer 104 is based on the results of the functions applied by the neurons in the preceding layers 104 in the neural network 102. During back-propagation, this process is repeated in the reverse order. The error values 120 for the pixels 114 are examined by the neurons in the last layer 104 of the neural network 102 first (e.g., the functions are applied by the neurons to the pixels 114), followed by the neurons in the second-to-last layer 104, followed by the neurons in the third-to-last layer 104, and so on.

The output of this back-propagation operation is an image that is different from the input image 106. The processors of the neural network 102 compare the image that is output from the back-propagation process through the neural network 102 with the input image 106 to determine an image differential 126. The image differential 126 also can be referred to as an image perturbation or a set of image perturbations. The image differential 126 may have little resemblance to the input image 106 as the image differential 126 represents changes 128 to the input image 106 that can be made in order to reduce or eliminate the error in the object classification scores provided by the neural network 102. For example, the image differential 126 can be applied to the input image 106 to create a context guided image 200 (shown in FIG. 2), which also can be referred to as a modified input image. The image 200 can be modified by the image differential 126 by changing one or more colors, intensities, positions, or the like, of one or more pixels 114 in the input image 106 to match that of the image differential 126.

The context guided image 200 can then be examined by the neural network 102 in a forward direction, similar to the previous examination of the input image 106. The different layers 104 of neurons can apply the same functions (with the same weights) as before, to generate a more accurate output image 202. The output image 202 can represent the set of score vectors for the pixels 114 in the input image 104. Because the input image 104 was modified to reduce the errors in the input image 104 during the previous examination by the neural network 102, the score vectors for the pixels 114 in the output image 202 will have lower errors and higher probabilities for one class in each pixel 114. For example, the first pixel 114 in the input image 106 previously having the score vector of [0.6 0.15 0.05 0.2] may now have a score vector of [0.99 0 0 0.01], indicating a 99% probability that the first pixel 114 represents the first object class. The probabilities for some pixels will increase, while the probabilities for other pixels will change from one label to another. In this example, the highest probability label does not change, but in other examples the highest probability can change. The greater probabilities indicate a clearer or more accurate recognition of the objects 110, 112 of the input image 106 in the output image 202, as shown in FIG. 2.

The image differential 126 can be determined from one input image 106, but applied to one or more other input images. For example, the image differential 126 can be determined by the neural network 102 from one or more input images 106 in order to determine the errors present when the neural network 102 examines input images 106. These errors can then be back-propagated through the same neural network 102 to determine the image differential 126, which can be applied to one or more new or other input images 106 prior to processing the input images 106 through the neural network 102. The image differential 126 may be more dependent on the functions and weights applied by the neurons of the layers 104 in the neural network 102 than on the characteristics of the pixels 114. As a result, the same or similar image differential 126 can be determined from different input images 106 but applied to other, different input images 106 to improve the object recognition by the neural network 102.

Figure 3:
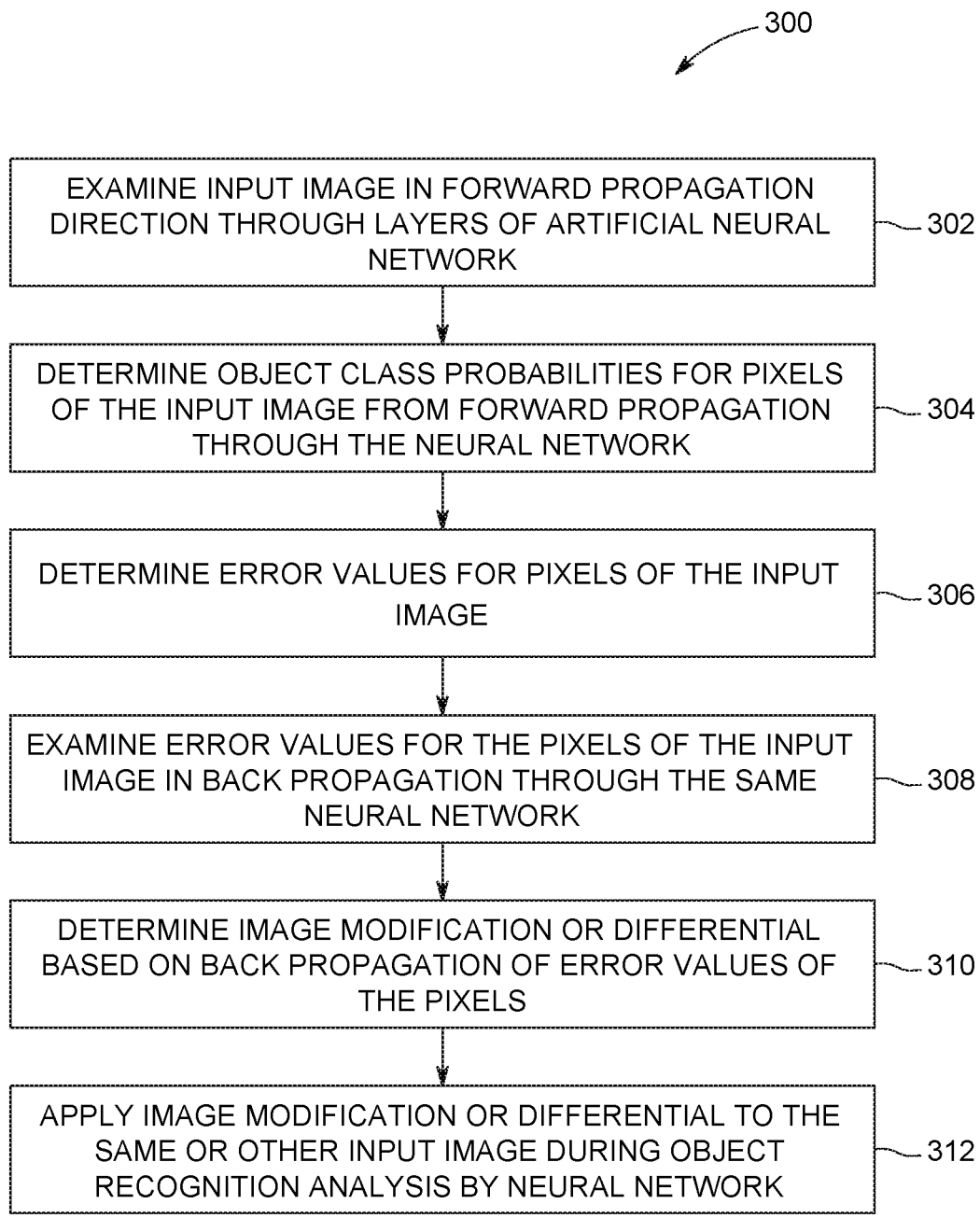
FIG. 3 illustrates a flowchart of one embodiment of a method for context guided prediction of objects in images using one or more deep neural networks.

FIG. 3 illustrates a flowchart of one embodiment of a method 300 for context guided prediction of objects in images using one or more deep neural networks. The method 300 can represent the operations performed by the processors of the neural network 102 shown in FIGS. 1 and 2 to improve the accuracy in automatically recognizing objects shown in images. The method 300 can represent an algorithm used to create (e.g., write) one or more software applications that direct operation of the neural network.

At 302, an input image is examined in a forward propagation direction through layers of an artificial neural network. As described above, the neural network receives an input image and two or more layers of artificial neurons of the neural network apply various weights in various functions to the input image to identify the probabilities that various objects appear in the input image. At 304, the object class probabilities of two or more object classes are determined for each pixel. These probabilities can be determined by the neural network calculating likelihoods that the pixel represents different object classes. For example, the neural network can determine that a pixel has a 60% probability of representing a first object class, a 15% probability of representing a different, second object class, a 5% probability of representing a different, third object class, and a 20% probability of representing a different, fourth object class. These probabilities result in the pixel having an object class score vector of [0.6 0.15 0.05 0.2]. This examination can occur or be repeated for each pixel or several pixels in the input image. In one embodiment, the method 300 also involves selecting the highest probability for each pixel in the image (or for each pixel of two or more, but not all, pixels in the image) and using this probability to convert the score vector of the pixel to a one-hot vector. With respect to the preceding example, this involves converting the score vector of the pixel from [0.6 0.15 0.05 0.2] to [1 0 0 0].

At 306, error values associated with the highest or higher probabilities for the pixels are determined. For example, the difference between the highest probability of an object class for each pixel and a 100% probability can be calculated as the error value for that pixel. This determination can occur or be repeated for each pixel or several pixels in the input image.

At 308, the error values for the various pixels in the input image are examined in the layers of the neural network in a back-propagation direction. As described above, the vectors of the error values of the pixels can be examined by the neurons in the layers of the neural network in a sequence that is opposite that in which the input image was examined at 302. The error values can be examined by the layers in the neural network without changing the functions or weights applied by the neurons in the various layers.

At 310, an image modification or differential based on this back-propagation operation is determined. The output of the back-propagation operation is an image that is different from the input image. The image that is output from the back-propagation process can be referred to as an image differential. This image modification or differential provides context to the types of classes of objects that are likely to be identified in the input image.

At 312, the image modification or differential is applied to the input image and, optionally, to another image, to create a context guided image. The context guided image is then examined by the neural network in a forward direction, similar to the previous examination of the input image described above. The different layers 104 of neurons can apply the same functions (with the same weights) as before, to generate a more accurate object recognition from the image. For example, when the input image (as modified by the image differential) is examined again by the same neural network in a forward direction using the same functions and weights as before, the probabilities of the pixels will be greater for one of the object classes (and the corresponding error will be smaller) relative to examining the input image without the image differential.

The recognition of one or more objects by the neural network can be used to automatically implement one or more responsive actions. As one example, the neural network can output a signal to a controller responsive to identifying an object in an image to automatically schedule or begin repair of a surface of an engine component, such as by spraying a restorative additive onto a thermal barrier coating shown in the image. As another example, the neural network can output a signal to a controller responsive to identifying an object in an image to automatically stop movement or change a direction of movement of a vehicle so as to avoid a collision between the vehicle and the object identified from the image.

Optionally, the image differential or changes to the images that are input into the neural network for automated object recognition are determined by a system other than the same neural network that performs the object recognition. Another, separate artificial neural network can generate guided image perturbations (e.g., modifications), which can be used to improve the performance of the neural network performing the object recognition. The neural network performing the object recognition is a previously trained deep neural network in one embodiment.

Guided image perturbations are generated during a testing phase by using the back-propagation process described above. The other neural network is trained to produce these perturbations based on ground truth images, or known images where the pixels are previously labeled or determined as representing different objects. The neural network that produces the image perturbations can be a fully convolutional neural network in one embodiment. A pixel in a ground truth image can be labeled in that the pixel is associated with a 100% probability that the pixel represents a known, designated object. The pixels can be manually labeled or can be labeled using another technique.

A learning system (the other neural network referred to above) learns to generate guided image perturbations. The learning neural network is provided with an input image having associated ground truth image. The learning neural network examines the input image and produces an output (e.g., an output image or a prediction of the class or shape of objects. This output is compared against ground truth information to determine an error (e.g., differences between the output image and the ground truth), and the error is back-propagated to obtain a differential image. This provides the system with an input image and differential image pair. Another neural network can be trained with input as the input image and output as the differential image, or guided perturbations. Once the system learns to generate guided perturbations, the system can be used to improve the performance of another neural network system by adding these perturbations to the input image (provided to the other neural network system) for evaluation. The performance in object recognition by the other neural network system is improved without changing the functions or weights used by the artificial neurons in the other neural network system. Instead, only the input image provided to the other neural network system is modified.

Figure 4:
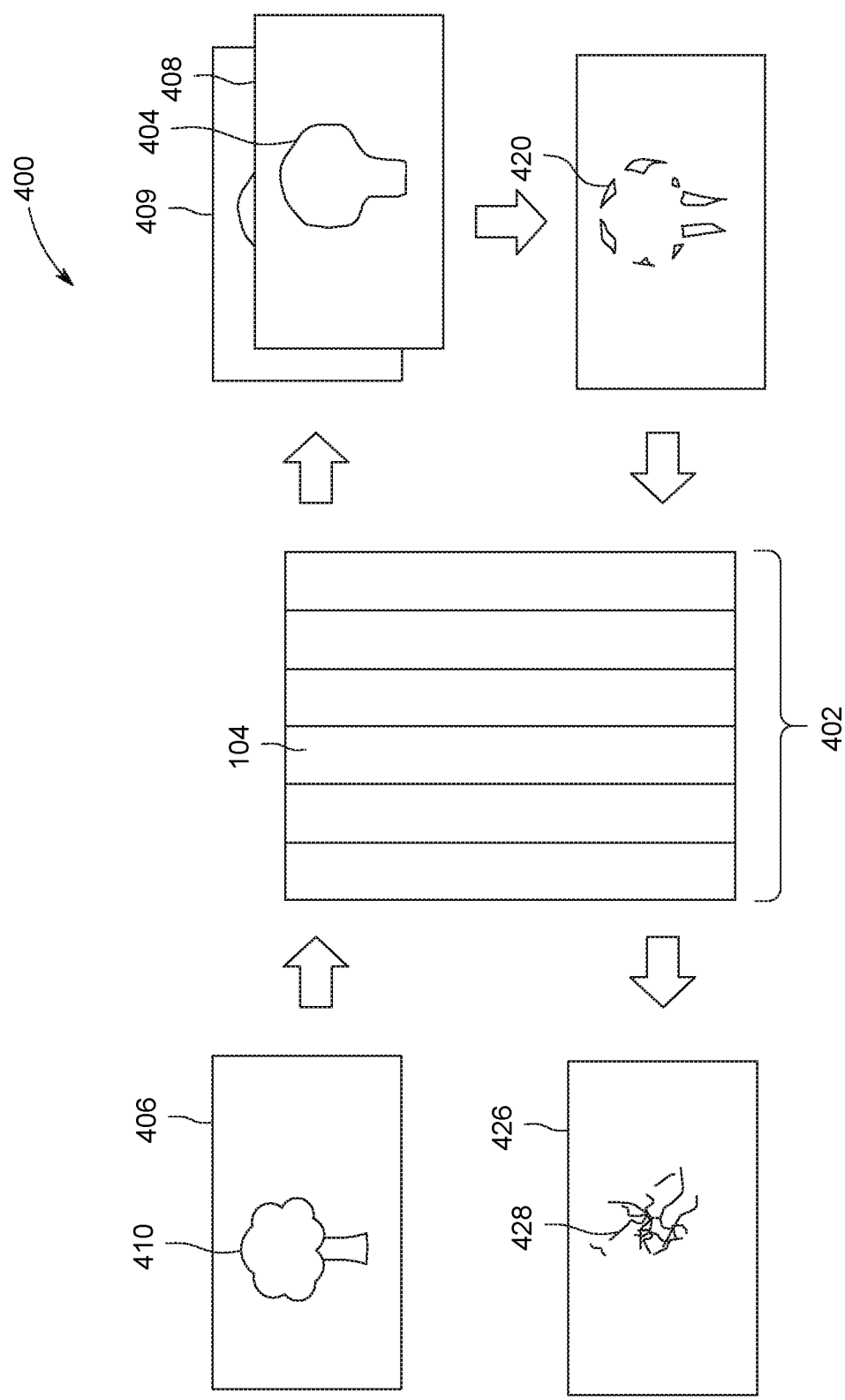
FIG. 4 illustrates one embodiment of a guided image perturbation system.

FIG. 4 illustrates one embodiment of a guided image perturbation system 400. The system 400 determines image perturbations based on input images, and provides these image perturbations to another neural network system (e.g., the neural network system 100 shown in FIGS. 1 and 2). The image perturbations can be used by the other neural network system 100 to modify input images 106 to modified input images 200, which are then examined by the neural network 100 to identify the objects 110, 112 in the original input image 106.

The perturbation system 400 includes a neural network 402, such as an artificial, convolution neural network formed from one or more processors (e.g., microprocessors, integrated circuits, field programmable gate arrays, or the like). Similar to the neural network 102, the neural network 402 is divided into two or more layers 104, such as an input layer that receives a ground truth or training image 406, an output layer that outputs an output image 408 (which can represent an image or a prediction or guess of what object or objects 410 are depicted in the ground truth image 406), and one or more intermediate (e.g., hidden) layers.

The input image 406 includes pixels 114 (shown in FIG. 1) that are examined by the artificial neurons in the neural network in a forward propagation direction through the layers of the neural network. This examination results in predictions of labels for each pixel (e.g., probabilities of which object class is represented by each pixel 114). The predictions of the pixels are then back-propagated through the layers of the same neural network in a reverse sequence to generate guided perturbations. Another artificial neural network can then be trained with the pair of the input image and the guided perturbation pair so that this other neural network can learn to generate guided perturbations given an input image. After this neural network is trained, when a new input image is passed to the neural network, guided perturbations associated with the new input image are first generated. Then, these guided perturbations are added to the input image and the input image with the guided perturbations are passed back through the first neural network, which predicts the object class labels for the pixels 114.

The neural network 402 then compares the predicted label image 408 with a ground truth image 409 to determine differences 420 between the images 408, 409. The differences 420 represent errors in object detection by the neural network 402. For example, if the neural network 402 was 100% accurate in the identification of the object 410 in the ground truth image 406, then the output image 408 would appear substantially similar or identical to the ground truth image 409. But, because the neural network 402 may not be 100% accurate in object detection, the representations 404 in the output image 408 differ from the appearance of the objects 410 in the ground truth image 409.

The differences 420 between the images 408, 409 are then back-propagated through the layers 104 of the neural network 402, similar to as described above in connection with FIGS. 1 and 2. The neural network 402 outputs an image differential 426 having differences or perturbations 428, similar to the image differential 126 having the differences or perturbations 126 that is output by the neural network 102 described above. One difference between the image differentials 126, 426 is that the image differential 126 is based on an input image 106 having objects 110, 112 that are not known or previously identified, whereas the image differential 426 (also referred to as a guided perturbed image) is based on a ground truth input image 409 having known or previously identified objects 410.

The image differential 426 this is output by the neural network 402 can then be used to train another neural network to train the other neural network to generate the image differential 426 when given an input image. A different guided perturbed image 426 can be determined and associated with each input image 406. One or more neural networks are trained to learn how to predict the guided perturbed image 426 given the input image 406. The image differential or guided perturbed image 426 can be further modified by the neural network such that each pixel that is output can be encoded into a label. This allows use of an artificial neural network similar to the neural network 102 to predict the differential image 426 as a label prediction problem.

Once such a neural network is trained, the trained neural network is used to generate a differential image directly for an input image. This differential image is then added to the input image, and passed through the neural network 402 to predict the pixel labels. This leads to improved accuracy and recognition of objects by the neural network 402.

Figure 5:
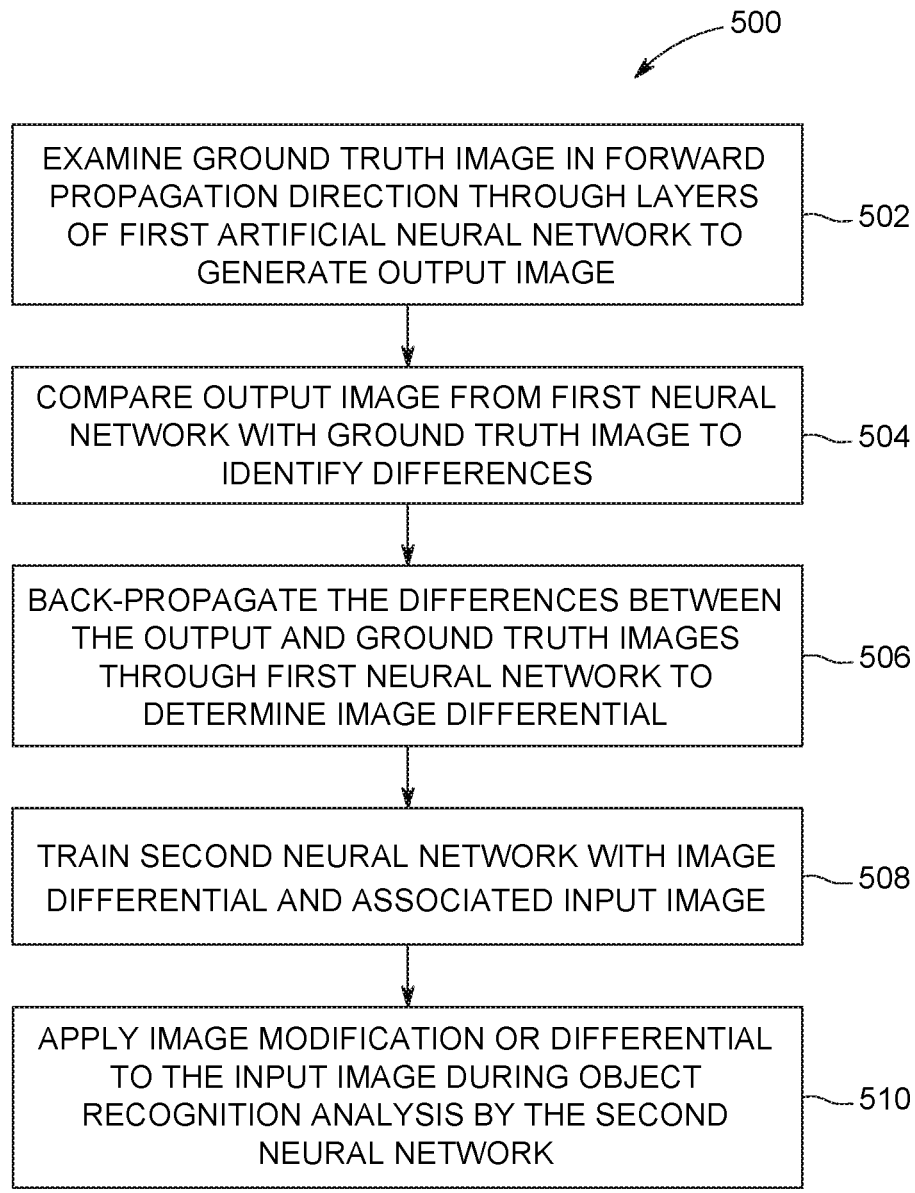
FIG. 5 illustrates a flowchart of one embodiment of a method for discriminative learning of guided image perturbations for prediction of objects in images using neural networks.

FIG. 5 illustrates a flowchart of one embodiment of a method 500 for discriminative learning of guided image perturbations for prediction of objects in images using neural networks. The method 500 can represent the operations performed by the processors of a neural network in order to train another neural network to improve the accuracy in automatically recognizing objects shown in images by the other neural network. The method 500 can represent an algorithm used to create (e.g., write) one or more software applications that direct operation of the neural networks.

At 502, a ground truth image is examined in a forward propagation direction through layers of a first artificial neural network. As described above, the neural network receives the input image and associated ground truth image having known or previously identified objects in known or previously identified locations, positions, and shapes in the image. Layers of artificial neurons in the first neural network apply various weights in various functions to the input image to identify the probabilities that various objects appear in the ground truth image. The first neural network is not aware of the objects in the ground truth image, but instead attempts to identify the objects as described above in connection with the neural network 102.

The first neural network outputs an image that represents the pixels identified by the first neural network as representing different object classes. Depending on the accuracy of objection recognition performed by the first neural network, the output image may closely resemble the ground truth image or may significantly differ from the ground truth image.

At 504, the output image from the first neural network is compared with the ground truth image by the first neural network (e.g., by one or more layers of the first neural network). These images are compared to identify differences between the objects identified by the first neural network and the objects actually appearing in the ground truth image. At 506, the differences between the images are examined in the layers of the first neural network in a back-propagation direction. Vectors of the pixels representing the differences between the images can be examined by the neurons in the layers of the neural network in a sequence that is opposite that in which the ground truth image was examined at 502. The differences can be examined by the layers in the neural network without changing the functions or weights applied by the neurons in the various layers. The output of the first neural network from the back-propagation of the image differences is an image differential or perturbation.

At 506, the image differential or perturbation is used to train another, second artificial neural network. The input image and associated image perturbation is provided to the second neural network so that the second neural network can be trained to generate the image perturbation based on the input image. The second neural network can then examine another input image in a forward direction, similar to the examination of the modified input image by the neural network at 312 (described above in connection with FIG. 3). The different layers 104 of neurons can apply the same functions (with the same weights) as before, to generate a more accurate object recognition from the image. For example, when the input image (as modified by the image differential) is examined again by the different neural network in a forward direction using the same functions and weights as before, the probabilities of the pixels will be greater for one of the object classes (and the corresponding error will be smaller) relative to examining the input image without the image differential.

Optionally, the image perturbations that are determined and applied to input images to improve object recognition by neural networks can be determined by a generative adversarial network (GAN). In one embodiment, the GAN generates the image perturbations that are then added to other images input into another neural network for object recognition. A GAN operates differently from other, traditional deep learning techniques in that the GAN learns an underlying distribution of data that forms an image. The GAN has two components: a generator and a discriminator. The generator creates image perturbations from a distribution (e.g., a Gaussian or other statistical distribution) of characteristics of pixels in a known image (e.g., an input image).

In a process that is similar to the discriminative training described above, an input image is passed through (e.g., examined by) a neural network to predict an output image. The predicted output is then compared to ground truth labels associated with the input image. These labels positively identify what each pixel (or at least each pixel of several, but not all, pixels) in the image represent. The errors between the predicted output and the ground truth is then back-propagated through the layers of the same neural network to generate a guided image perturbation (or image differentials), as described above.

One difference in this embodiment is that guided perturbation pair is obtained. A GAN is used to train such a pair of images. An original input image is provided to the GAN, and the GAN is trained to predict the guided perturbation associated with the input image. The discriminator of the GAN then attempts to determine whether the perturbed image is generated using GAN or whether the image is the original guided perturbation that was generated from first neural network. Over time or repetitions, the generator of the GAN learns or is trained to create image perturbations that are close in appearance to the original guided perturbation image pair.

Figure 6:
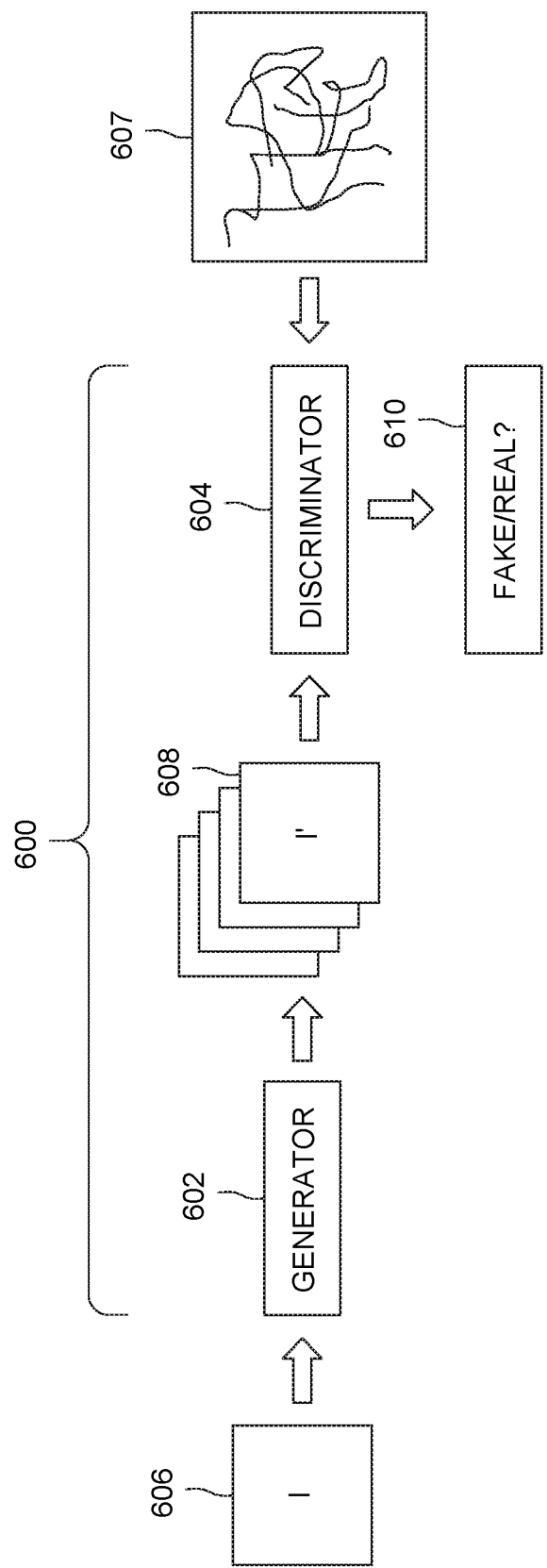
FIG. 6 illustrates one embodiment of a generative adversarial network system.

FIG. 6 illustrates one embodiment of a GAN system 600. The system 600 includes a generator network system 602 ("Generator" in FIG. 6) and a discriminator network system 604 ("Discriminator" in FIG. 6). The network systems 602, 604 represent one or more processors (e.g., one or more microprocessors, field programmable gate arrays, and/or integrated circuits) that operate to generate modifications to images and attempt to identify objects shown in the modified images. In one embodiment, the network systems 602, 604 are artificial neural networks, as described above.

Figure 7:
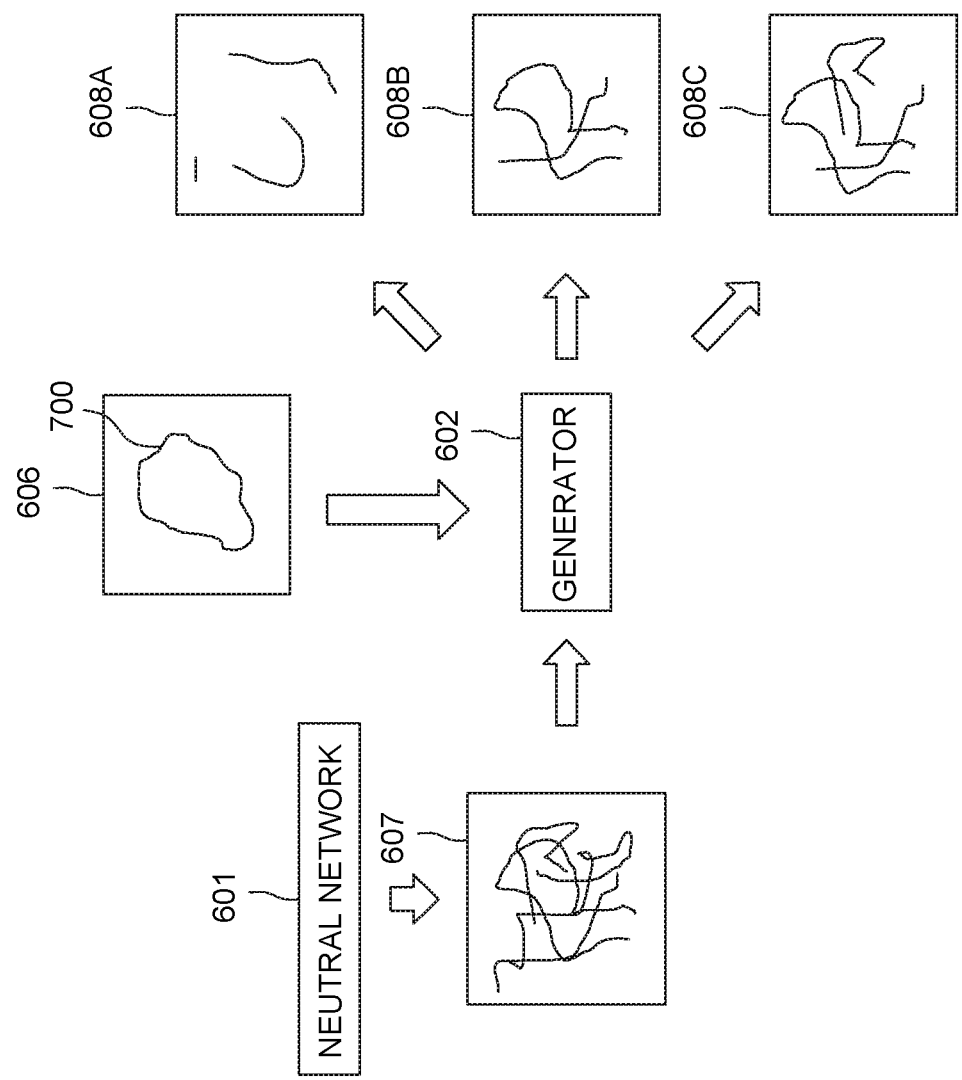
FIG. 7 illustrates one embodiment of operation of a generator network system shown in FIG. 6.

With continued reference to the system 600 shown in FIG. 6, FIG. 7 illustrates one embodiment of operation of the generator network system 602. The generator network system 602 receives image perturbations 607 from a neural network 601 (which can be one or more of the neural networks described herein). The neural network 601 creates the image perturbations 607 based on an input image 606 ("I" in FIG. 6) of an object 700, similar to as described above. This object 700 can be spalling or other damage to a coating on a surface, such as spalling of a thermal barrier coating on a turbocharger blade. Alternatively, the object 700 can be a tumor or lesion on or in a body of a human or other animal. In another embodiment, the object 700 can be a person, vehicle, tree, or other object. The generator system 602 can receive the image perturbations 607 from the neural network 601 via one or more databases, sensors, cameras, or the like, via one or more wired and/or wireless connections.

The generator network system 602 examines characteristics of the image 606 pixels to determine one or more distributions of these characteristics. The generator network system 602 can determine the statistical distributions of pixel intensities, colors, or the like, as well as relative positions of the pixels having the various characteristics. The generator network system 602 can determine the distribution from multiple similar image perturbations 607. For example, the generator network system 602 can determine the distribution of pixel characteristics of image perturbations determined by the neural network 601 from several different images of spalling of a selected type of coating on a selected material substrate.

The generator network system 602 creates one or more generated image perturbations 608 (generated perturbations 608A-C in FIG. 7) based on the input image 606 ("I'" in FIG. 6) and based on the distributions learned (e.g., determined) by the generator network system 602 from the image 606. This pair of the input image 606 and associated image perturbations 607 can be used to determine whether the generator network 602 is creating image perturbations 608 (e.g., perturbations 608A-C in FIG. 7) that are similar enough to the image perturbations 607 received from the other neural network that the discriminator 604 determines that the created perturbations 608 are the same as the original image perturbations 607.

As shown in FIG. 6, the created image perturbations 608 are provided to the discriminator network system 604 from the generator network system 602. The perturbations 608 can be communicated between the systems 602, 604 via one or more wired and/or wireless connections. The discriminator network system 604 examines a created image perturbation 608 and attempts to determine whether the created image perturbation 608 is the same as the image perturbation 607 created by another neural network, as described above. In doing so, the discriminator network system 604 attempts to predict a guided perturbation image.

The GAN 600 learns to predict guided perturbations generated using a neural network. The goal of the generator network 602 is to mimic the process of generating guided image perturbations and fool or trick the discriminator network 604 into determining that the mimicked guided image perturbations are the same or original image perturbations created by another neural network.

For example, in FIG. 7, the created perturbation 608A can be a first image perturbation 608 created by the generator network system 602. The discriminator network system 604 examines the created perturbation 608A and does not recognize or identify the created perturbation 608A as being the same image perturbation as the image perturbation 607 created by another neural network. The discriminator network system 604 communicates the recognition that the image perturbations 607, 608A are not the same to the generator network system 602 (e.g., via one or more wired and/or wireless connections). In response, the generator network system 602 creates another, different image perturbation 608B. The discriminator network system 604 examines the second created image perturbation 608B and determines that the image perturbations 607, 608B are different. The discriminator network system 604 communicates this difference to the generator network system 602 (e.g., via one or more wired and/or wireless connections).

This back-and-forth process can continue between the network systems 602, 604. In the example shown in FIG. 7, the generator network system 602 creates another, different image perturbation 608C. In this example, the discriminator network system 604 examines the image perturbations 608C and determines that the perturbations 608C are the same as the image perturbations 607 received from another neural network. The discriminator network system 604 communicates this similarity or confirmation to the generator network system 602 (e.g., via one or more wired and/or wireless connections).

The image perturbations 608C created by the generator network system 602 (and that the discriminator network 604 determines are the same as the image perturbations 607 provided from the other neural network) can then be added to an input image that is provided to another neural network (e.g., the neural network 102) for object detection.

Figure 8:
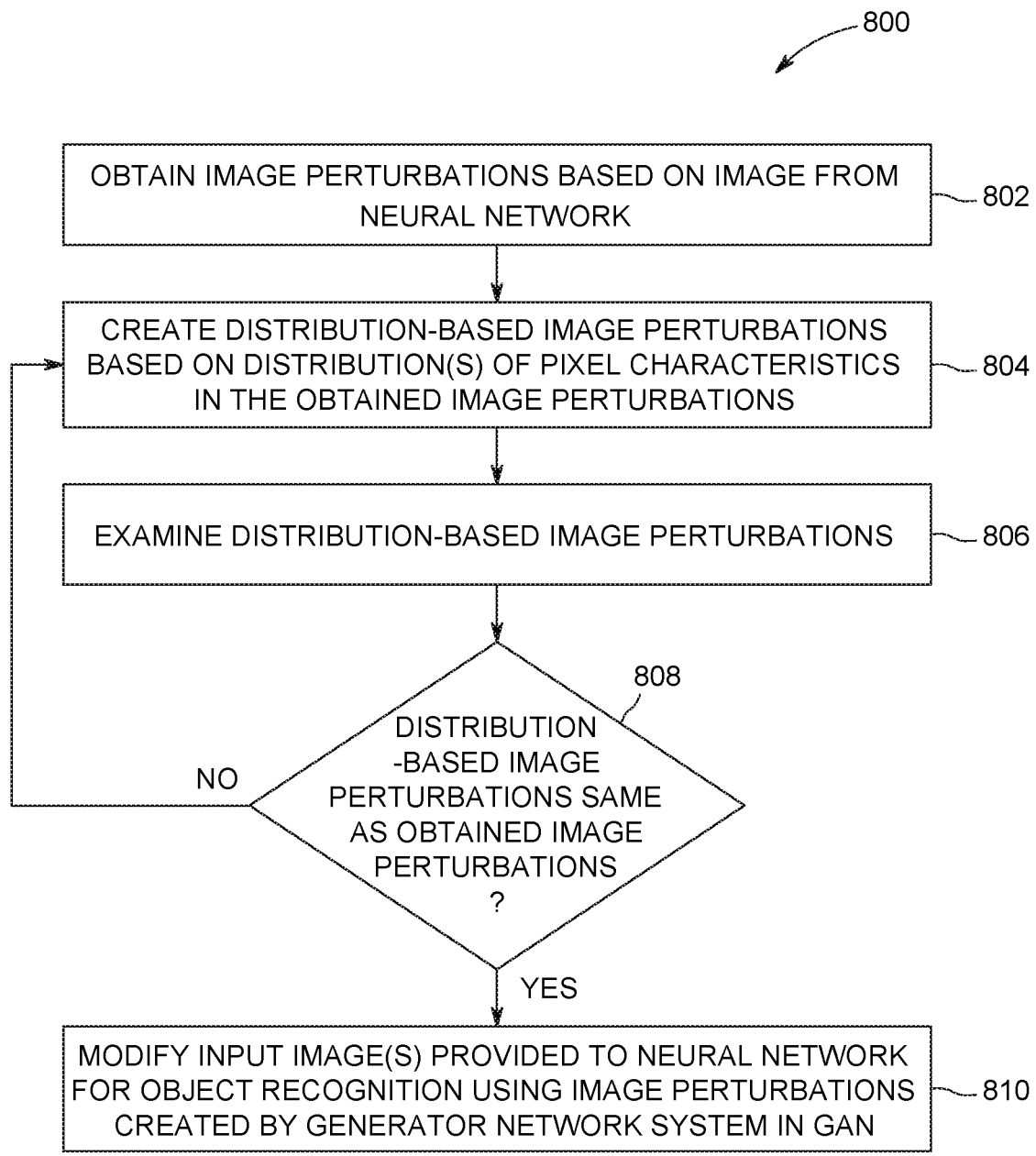
FIG. 8 illustrates a flowchart of one embodiment of a method for using generative adversarial networks to learn guided image perturbations.

FIG. 8 illustrates a flowchart of one embodiment of a method 800 for using generative adversarial networks to learn guided image perturbations. The method 800 can represent the operations performed by the processors of the network systems 602, 604 shown in FIG. 6 to generate image perturbations that are applied to input images provided to neural networks for improving the accuracy in automatically recognizing objects shown in the input images. The method 800 can represent an algorithm used to create (e.g., write) one or more software applications that direct operation of the network systems 602, 604.

At 802, image perturbations of one or more input images are obtained. The images can be obtained from a database, camera, or the like. The image perturbations can be determined from another neural network, as described above. At 804, distribution-based image perturbations are created based on the image perturbations received at 802. As described above, the generator network system 602 can create the distribution-based image perturbations based on distributions of characteristics of pixels in the image perturbations obtained from another neural network.

At 806, the distribution-based image perturbations are examined. The perturbations can be examined by a discriminator network in a GAN examining the characteristics of pixels in the perturbations. At 808, a determination is made as to whether the distribution-based image perturbations are the same as the obtained image perturbations. For example, the discriminator network system 604 can determine whether the distribution-based image perturbations created by the generator network system 602 are the same or undiscernible from the image perturbations received from the other neural network and based on an input image. If the image perturbations are not discernible by the discriminator network system, then the generator network system 602 has successfully mimicked the image perturbations received from the other neural network. As a result, flow of the method 800 can proceed toward 810.

But, if the discriminator network system 604 is able to determine that the distribution-based image perturbations are not the same as the image perturbations from the other neural network, then the generator network system 602 has not successfully mimicked the image perturbations from the other neural network. As a result, flow of the method 800 can return toward 804.

At 810, image perturbations that are created by the generator network system can be used to modify one or more input images for examination by another neural network. For example, an unlabeled input image provided to an artificial neural network for automated object recognition can be modified by the image perturbations created by the generator network system prior to submitting the image to the neural network. This modification can improve the accuracy by which the neural network automatically identifies objects in the input image (relative to examining the input image without being modified by the image perturbations).

As described above, the artificial neurons of neural networks receive input images and apply functions on the images and pass results of the functions to other neurons. Weight values are associated with vectors (or functions) and neurons in the network, and the weight values constrain how input images are related to outputs of the neurons. In one embodiment, the weights or weight values are not changed after training a neural network to identify objects in images. Alternatively, the weights are changed based on errors in object recognition.

For example, deep learning is a technique used for object recognition, image segmentation, etc. Training a deep learning model can involve a back-propagation process (as described above), which helps the neural network to learn from mistakes in identifying objects in images and obtain better representations of objects of interest in the images. In one embodiment of a weighted softmax loss process, this back-propagation process can be modified by changing the weights or weight values applied by neurons to those pixels that were incorrectly classified but correctly classified after guided image perturbations (described above) are added to the image. This causes the neural network to be tuned to reduce further classification errors by focusing on those errors more during subsequent examination of images.

Figure 9:
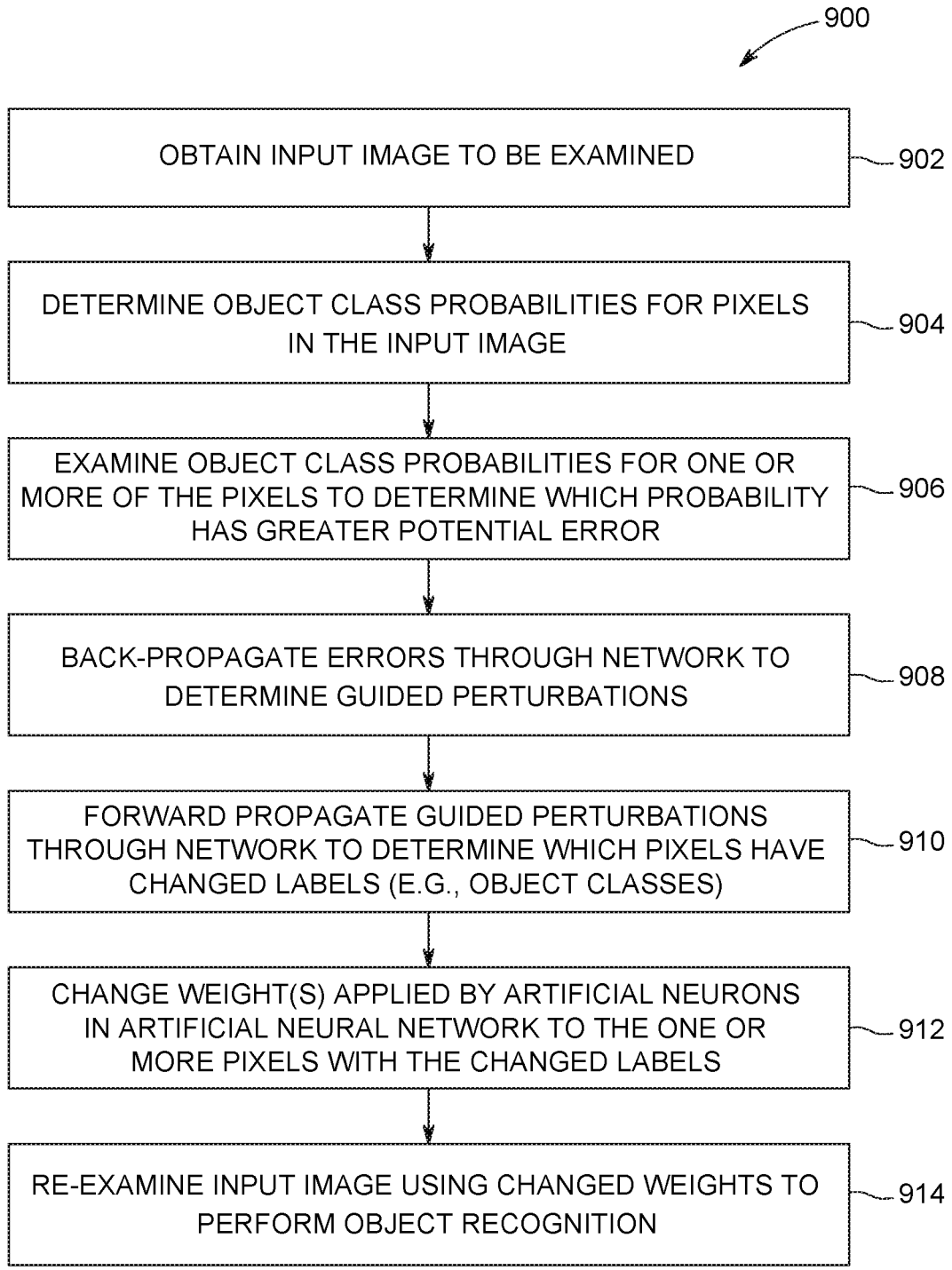
FIG. 9 illustrates a flowchart of one embodiment of a method for performing a weighted soft-max loss for image segmentation.

FIG. 9 illustrates a flowchart of one embodiment of a method 900 for performing a weighted soft-max loss for image segmentation. The method 900 can be performed by one or more embodiments of the artificial neural networks (e.g., the network 102) described herein to change one or more of the weights applied by the neurons in the neural networks for improving object recognition by the networks. The method 900 can represent the operations performed by the processors of the neural network system 102 shown in FIG. 1. The method 900 can represent an algorithm used to create (e.g., write) one or more software applications that direct operation of the neural network system 102. In one embodiment, the method 900 is performed using a fully convoluted neural network. Alternatively, another type of artificial neural network performs the method 900.

At 902, an input image to be examined by the neural network is obtained. This input image can depict one or more objects to be recognized or identified by the neural network. The artificial neurons in the layers of the neural network can segment and examine the characteristics of pixels in the image by applying weighted functions to the characteristics of the pixels. At 904, object class probabilities for pixels in the image are determined by the neural network. As described above, each of one or more pixels in the image can be associated with a vector or group of probabilities [a b c d] that represents the probabilities that different object classes are represented or depicted by that pixel. The probability a represents the likelihood that the pixel represents an object of a first object class, the probability b represents the likelihood that the pixel represents an object of a different, second object class, and so on.

At 906, the object class probabilities for at least one of the pixels in the input image are examined. The processors of the neural network can determine which of the object class probabilities for a pixel has the largest potential error, or a potential error that is larger than one or more other object class probabilities for that pixel. For example, a first pixel is associated with a vector [0.6 0.2 0.2] of object class probabilities. The processors can determine that, due to the first object class probability of 0.6 (or 60%) being larger than the other object class probabilities of 0.2 (or 20%), the pixel most likely represents the first object class (e.g., a human body instead of a vehicle or a tree). The processors can then associate an updated object class vector of [1 0 0] with this pixel, indicating that the pixel represents the first object class.

The processors can then calculate potential errors of the different object classes for that same pixel. The potential errors can be calculated based on differences (or absolute values of the differences) between the calculated object class probabilities and the updated object class probabilities. For example, the pixel in the preceding example can be associated with potential errors of [0.4 −0.2 −0.2]. The method 900 identifies the error of 0.4 as being the largest or one of the largest potential errors associated with that pixel.

At 908, the errors are back-propagated through the neural network (without modifying the weights of the network) to generate guided perturbations. At 910, the guided perturbations are examined in the neural network in a forward propagation process through the network to determine which pixels have changed labels (e.g., have changed which object class the pixel(s) most likely represent). At 912, additional weight is given to those pixels in the network, such as by multiplying a weight factor to error computation of those pixels. For example, the weights used by the neurons in the network are changed to increase the weights applied to those pixels having the changed labels. At 914, the pixels are back-propagated through the network again, but this time with a goal to modify the weights of the network to better determine what object classes are represented by the pixels.

Changing weights of the network affects the prediction of objects in images by the network. The training of the neural network includes finding the set of weights that give improved object recognition performance relative to one or more (or all) other weights. Changing the weights used by the network can result in increased confidence in object detection relative to using other weights.

In one embodiment of the inventive subject matter disclosed herein, an artificial neural network can be trained using non-annotated data. A neural network can be trained to automatically recognize objects within images by providing the neural network with ground truth images. These images can be annotated, or labeled, with each pixel being associated with an object class represented by the pixel (instead of the pixels being associated with probabilities that the pixels represent any of two or more different object classes). The neural network applies a first set of functions and weights to attempt to automatically identify the object(s) in the ground truth image, and the results are compared with the ground truth image. Differences are identified, and the functions and weights can be modified into a different, second set of functions and weights to try and improve the object recognition so that the output image from the neural network is closer to the ground truth image. This process can be repeated with several ground truth images to gradually train and improve the object recognition performed by the neural network.

But, the ground truth images can be time-consuming and costly to obtain, particularly in situations where the neural network is being trained to recognize objects in images that are not or cannot be publicly available. For example, some vendors may provide engines or other equipment to government entities, and may desire to examine images of the engines or equipment for automatic detection of spalling, cracking, etc., during inspection of the engines or equipment. These vendors may be prevented by the government entities from publicly disclosing the images. This can prevent use of crowd-sourcing techniques to generate annotated image data (e.g., ground truth images) for training neural networks for automatic detection of spalling, cracks, etc. Instead, many man-hours of examining, identifying, and labeling individual pixels in images may be required to generate ground truth images for training a neural network.

In one embodiment of the inventive subject matter described herein, the systems and methods train deep neural networks for automatic object recognition in images using unsupervised data along with a relatively small amount of supervised data. The unsupervised data includes images having pixels that are not labeled or otherwise previously identified as representing any object classes. The supervised data includes training or ground truth images, which includes pixels that are previously identified (e.g., manually) and labeled as representing various object classes. This new training process can be referred to as semi-supervised training of a neural network. Guided perturbed output of an input image is treated as a ground truth image (in the absence of a ground truth image), and is back propagated to train the neural network.

Figure 10:
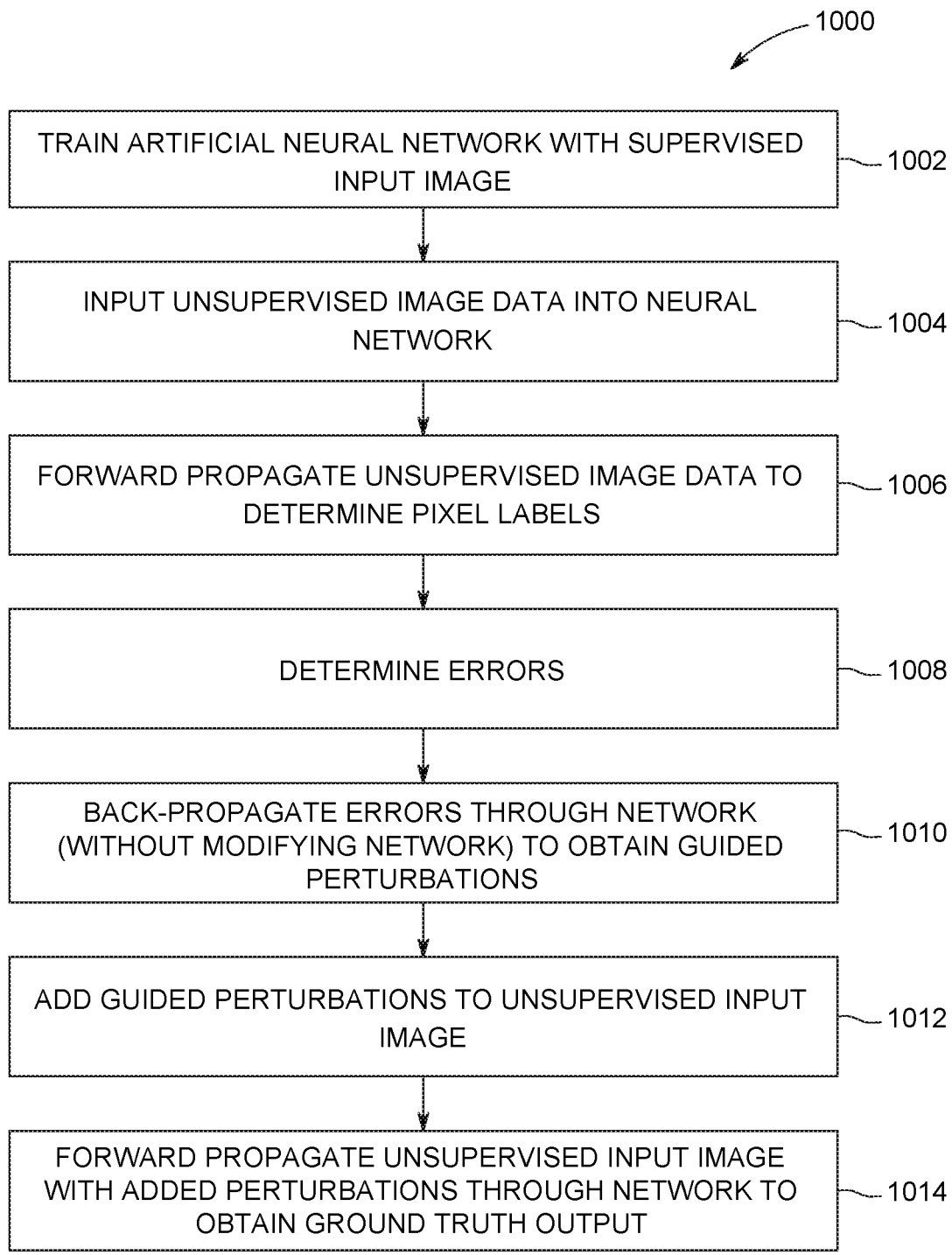
FIG. 10 illustrates a flowchart of one embodiment of a method for training an artificial neural network for automated object recognition in images using unsupervised image data as training data.

FIG. 10 illustrates a flowchart of one embodiment of a method 1000 for training an artificial neural network for automated object recognition in images using unsupervised image data as training data. The method 1000 can be performed by one or more embodiments of the artificial neural networks (e.g., the network 102) described herein. The method 1000 can represent the operations performed by the processors of the neural network system 102 shown in FIG. 1. The method 1000 can represent an algorithm used to create (e.g., write) one or more software applications that direct operation of the neural network system 102.

Figure 11:
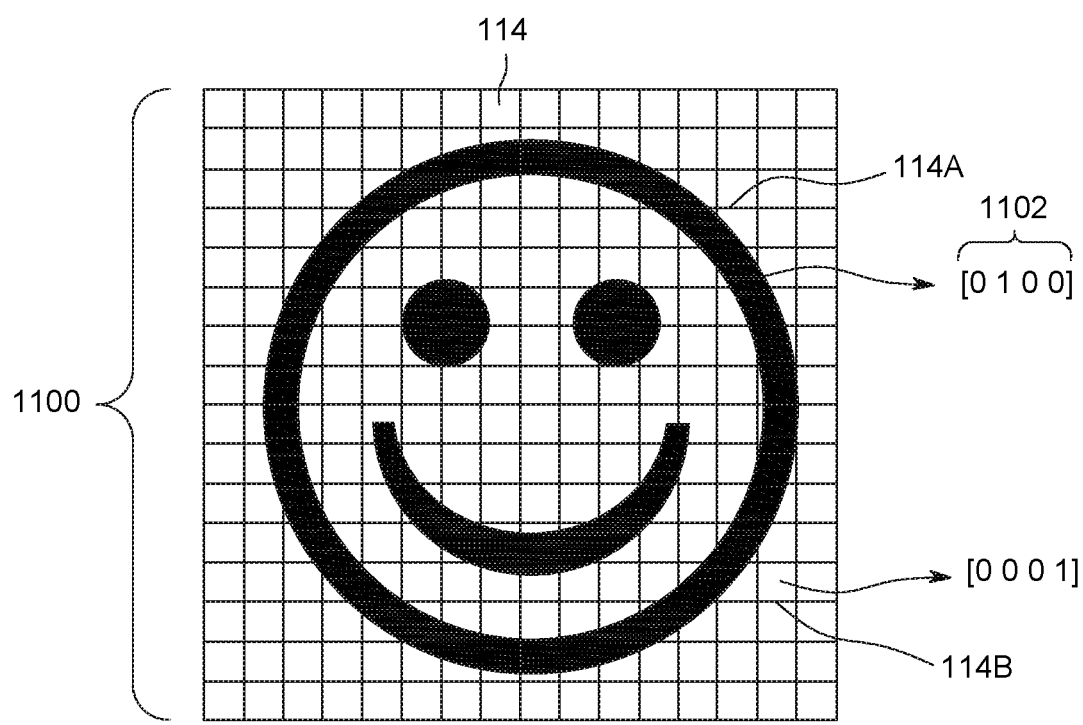
FIG. 11 illustrates one example of supervised image data.

At 1002, an artificial neural network is trained using supervised image data. FIG. 11 illustrates one example of supervised image data 1100. The supervised image data 1100 can be formed from several pixels 114 that are labeled or otherwise associated with an object class vector 1102. The object class vector 1102 indicates what the associated pixel 114 represents. As described above, object class vectors 1102 can include probabilities that various different object classes are represented by the corresponding pixel 114. In the illustrated example, the supervised image data 1100 has been manually labeled by each pixel 114 being associated with the object class represented by the pixel 114. For example, the pixel 114A is labeled with an object class vector 1102 of [0 1 0 0] because the second object class in the vector 1102 (the value of one) represents a human face while the pixel 114B is labeled with an object class vector 1102 of [0 0 0 1] because the fourth object class in the vector 1102 (the value of one) represents background (e.g., space, air, ground, etc.). Because there is 100% certainty that the pixels 114 represent the corresponding object classes, the object class vectors 1102 include values of one or 100% for one object class and values of zero or 0% for the other object classes. The neural network is trained using supervised image data, as described above.

At 1004 in the method 1000 shown in FIG. 10, unsupervised image data is input into the neural network. The unsupervised image data includes one or more images having pixels or other areas that are not previously labeled or identified as representing one or more object classes. For example, in contrast to the supervised image data 1100 having pixels 114 representing known object classes, the unsupervised image data can include pixels 114 that represent unknown or yet-to-be-identified object classes.

At 1006, the unsupervised image data is forward propagated through the layers of the neural network. As described above, this forward propagation of the image data can yield labels for the pixels of the image data. For example, the neural network 102 can examine the unsupervised image data 1200 and determine a label 1102 of [0.75 0.05 0.0 0.2], which indicates a 75% likelihood that the identified pixel 114 represents an object of the first object class, a 5% likelihood that the identified pixel 114 represents an object of the second object class, and so on.

At 1008, errors in the labels of the pixels are determined. For example, the most confident object class probability is identified (e.g., 75%), and this probability is converted to 100%, and the difference between 100% and each of the object class probabilities is determined. With respect to the above example, the errors for the pixel 114 can be calculated as [0.25 −0.05 −1.0 −0.8].

At 1010, the errors determined at 1008 are back-propagated through the same network, without updating or modifying the network. This back-propagation process results in the network outputting guided perturbations. At 1012, the guided perturbations determined at 1010 are added to the input (unsupervised) image. The unsupervised image (modified by the guided perturbations) is then forward propagated through the network at 1014 to determine new or updated class probabilities for the pixels. These probabilities are then compared to a threshold to determine what object each pixel represents. For example, if a pixel in the unsupervised image modified by the guided perturbations has probabilities of [0.75 0.05 0.0 0.2], these probabilities can be compared with a threshold of 70%. Because the first object class exceeds this elevated threshold, the processors of the neural network can determine that the pixel 114 represents the first object class. This pixel 114 of the unsupervised image data can now be treated as a labeled pixel. This process can be used for multiple or all pixels in order to create supervised or ground truth image data for training of one or more neural networks.

In one embodiment, a method includes determining object class probabilities of pixels in a first input image by examining the first input image in a forward propagation direction through layers of artificial neurons of an artificial neural network. The object class probabilities indicate likelihoods that the pixels represent different types of objects in the first input image. The method also includes selecting, for each of two or more of the pixels, an object class represented by the pixel by comparing the object class probabilities of the pixels with each other, determining an error associated with the object class that is selected for each pixel of the two or more pixels, determining one or more image perturbations by back-propagating the errors associated with the object classes selected for the pixels of the first input image through the layers of the neural network without modifying the neural network, and modifying a second input image by applying the one or more image perturbations to one or more of the first input image or the second input image prior to providing the second input image to the neural network for examination by the neurons in the neural network for automated object recognition in the second input image.

In one example, determining the object class probabilities includes determining a probability for each of two or more object classes for each of the pixels.

In one example, selecting the object class for each of the two or more pixels includes selecting the object class associated with the object class probability that is larger than one or more other probabilities of the object class probabilities associated with the same pixel.

In one example, determining the error associated with the object class that is selected for each of the pixels includes calculating a difference between a one hundred percent object class probability and the object class probability associated with the object class that is selected.

In one example, determining the one or more image perturbations includes determining one or more changes to characteristics of the pixels by the layers of the neural network examining the errors associated with the pixels in a reverse sequence of the layers.

In one embodiment, a method includes determining an output image by examining a ground truth image in a forward propagation direction through layers of artificial neurons in a first artificial neural network, identifying one or more differences between the output image and the ground truth image by comparing characteristics of pixels in the output image with characteristics of pixels in the ground truth image, determining one or more image perturbations by back-propagating the one or more differences between the output image and the ground truth image through the layers of the first neural network, and training at least one other artificial neural network using the one or more image perturbations.

In one example, the ground truth image includes the pixels previously labeled as being representative of two or more different object classes.

In one example, determining the one or more image perturbations includes determining one or more changes to the characteristics of the pixels in the output image by the layers of the neural network examining the one or more differences between the output image and the ground truth image in a reverse sequence of the layers of the first neural network.

In one embodiment, a method includes creating one or more distribution-based image perturbations using a generator of a generative adversarial network (GAN) based on a distribution of one or more characteristics of pixels in image perturbations received by the GAN from a neural network, determining whether the one or more distribution-based image perturbations are one or more of similar or identical to the image perturbations received from the neural network using a discriminator of the GAN, and modifying one or more input images provided to the neural network using the one or more distribution-based image perturbations for automated object recognition by the neural network responsive to determining that the one or more distribution-based image perturbations are one or more of similar or identical to the image perturbations received from the neural network.

In one embodiment, a method includes, for each pixel of two or more pixels in a first image, determining probabilities that the pixel represents different associated object classes using a first artificial neural network, comparing the probabilities to a designated, non-zero probability threshold, labeling the pixel as representing the object class associated with the first probability responsive to determining that a first probability of the probabilities for the pixel exceeds the designated, non-zero probability threshold, and training at least one of the first artificial neural network or a different, second artificial neural network to automatically recognize one or more objects in one or more input images using the pixel that is labeled.

In one example, labeling the pixel is repeated for plural pixels in order to generate a training image.

In one example, training the at least one of the first artificial neural network or the second artificial neural network is performed using the training image.

In one example, the training image is generated without manual labeling of an object class for the pixels constituting the training image.

In one embodiment, a method includes determining object class probabilities of pixels in an input image using an artificial neural network having artificial neurons that apply weighted functions to one or more characteristics of the pixels to determine the object class probabilities, determining which of the object class probabilities for the pixel is associated with a larger potential error in object classification than one or more of the object class probabilities for the pixel for each pixel of at least one of the pixels in the input image, changing one or more weights applied by the artificial neurons in the weighted functions based on the larger potential error associated with the object class probabilities, and re-determining the object class probabilities of the pixels in the input image using the weighted functions with the one or more weights that were changed to automatically detect one or more objects in the input image.

In one example, the object class probabilities indicate likelihoods that the pixels represent different associated types of objects in the input image.

In one example, determining which of the object class probabilities for each pixel includes determining which of the object class probabilities is largest of the object class probabilities for the pixel.

In one embodiment, a method includes forward propagating one or more unsupervised images through an artificial neural network to determine potential pixel labels, back-propagating one or more potential errors in the potential pixel labels through the neural network to determine guided image perturbations, adding the guided image perturbations to the one or more unsupervised images, and forward propagating the guided image perturbations with the one or more supervised images through the neural network to generate ground truth output. The ground truth output is configured to train one or more of the neural network or another neural network.

In one example, the one or more supervised training images include pixels previously labeled with one or more objects that the pixels represent.

In one example, the one or more unsupervised training images include pixels that have not been previously labeled with one or more objects that the pixels represent.

In one example, the method also includes training the artificial neural network to recognize an object in an image with one or more supervised training images.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:

determining object class probabilities of pixels in a first input image by examining the first input image in a forward propagation direction through layers of artificial neurons of an artificial neural network, the object class probabilities indicating likelihoods that the pixels represent different types of objects in the first input image;

selecting, for each of two or more of the pixels, an object class represented by the pixel by comparing the object class probabilities of the pixels with each other;

determining an error associated with the object class that is selected for each pixel of the two or more pixels;

determining one or more image perturbations by back-propagating the errors associated with the object classes selected for the pixels of the first input image through the layers of the neural network without modifying the neural network; and modifying a second input image by applying the one or more image perturbations to one or more of the first input image or the second input image prior to providing the second input image to the neural network for examination by the neurons in the neural network for automated object recognition in the second input image.

2. The method of claim 1, wherein determining the object class probabilities includes determining a probability for each of two or more object classes for each of the pixels.

3. The method of claim 1, wherein selecting the object class for each of the two or more pixels includes selecting the object class associated with the object class probability that is larger than one or more other probabilities of the object class probabilities associated with the same pixel.

4. The method of claim 1, wherein determining the error associated with the object class that is selected for each of the pixels includes calculating a difference between a one hundred percent object class probability and the object class probability associated with the object class that is selected.

5. The method of claim 1, wherein determining the one or more image perturbations includes determining one or more changes to characteristics of the pixels by the layers of the neural network examining the errors associated with the pixels in a reverse sequence of the layers.

6. A system comprising one or more processors configured to:

determine object class probabilities of pixels in a first input image by examining the first input image in a forward propagation direction through layers of artificial neurons of an artificial neural network, the object class probabilities indicating likelihoods that the pixels represent different types of objects in the first input image;

select, for each of two or more of the pixels, an object class represented by the pixel by comparing the object class probabilities of the pixels with each other;

determine an error associated with the object class that is selected for each pixel of the two or more pixels;

determine one or more image perturbations by back-propagating the errors associated with the object classes selected for the pixels of the first input image through the layers of the neural network without modifying the neural network; and modify a second input image by applying the one or more image perturbations to one or more of the first input image or the second input image prior to providing the second input image to the neural network for examination by the neurons in the neural network for automated object recognition in the second input image.

7. The system of claim 6, wherein the one or more processors are configured to determine the object class probabilities by determining a probability for each of two or more object classes for each of the pixels.

8. The system of claim 6, wherein the one or more processors are configured to select the object class for each of the two or more pixels by selecting the object class associated with the object class probability that is larger than one or more other probabilities of the object class probabilities associated with the same pixel.

9. The system of claim 6, wherein the one or more processors are configured to determine the error associated with the object class that is selected for each of the pixels by calculating a difference between a one hundred percent object class probability and the object class probability associated with the object class that is selected.

10. The system of claim 6, wherein the one or more processors are configured to determine the one or more image perturbations by determining one or more changes to characteristics of the pixels by the layers of the neural network examining the errors associated with the pixels in a reverse sequence of the layers.

* * * * *